United States Patent
Richter

(10) Patent No.: US 9,279,441 B2
(45) Date of Patent: Mar. 8, 2016

(54) TRACER PIN ARRANGEMENT

(75) Inventor: Frank Richter, Heidenheim (DE)

(73) Assignee: Carl Zeiss 3D Automation GmbH (DE)

(*) Notice: Subject to any disclaimer, the term of this patent is extended or adjusted under 35 U.S.C. 154(b) by 220 days.

(21) Appl. No.: 13/822,089

(22) PCT Filed: Sep. 12, 2011

(86) PCT No.: PCT/DE2011/001719
§ 371 (c)(1),
(2), (4) Date: Jun. 13, 2013

(87) PCT Pub. No.: WO2012/041274
PCT Pub. Date: Apr. 5, 2012

(65) Prior Publication Data
US 2013/0247402 A1    Sep. 26, 2013

(30) Foreign Application Priority Data

Sep. 10, 2010  (DE) ............... 10 2010 044 972
Apr. 29, 2011  (DE) ............... 10 2011 100 075

(51) Int. Cl.
*G01B 5/012* (2006.01)
*F16B 17/00* (2006.01)
*G01B 5/016* (2006.01)

(52) U.S. Cl.
CPC ............ *F16B 17/00* (2013.01); *G01B 5/012* (2013.01); *G01B 5/016* (2013.01); *Y10T 403/1624* (2015.01)

(58) Field of Classification Search
CPC .................. G01B 5/012; G01B 5/016
USPC ................... 33/559, 557, 560, 556
See application file for complete search history.

(56) References Cited

U.S. PATENT DOCUMENTS

| 3,823,482 | A | * | 7/1974 | Schiler | 33/520 |
| 4,503,616 | A | * | 3/1985 | Pullen | 33/558 |
| 5,509,211 | A | * | 4/1996 | Ernst | 33/561 |
| 5,564,664 | A | | 10/1996 | Oschwald | |
| 5,822,877 | A | | 10/1998 | Dai | |
| 5,848,477 | A | | 12/1998 | Wiedmann et al. | |
| 5,953,687 | A | * | 9/1999 | Zink et al. | 702/168 |

(Continued)

FOREIGN PATENT DOCUMENTS

DE       44 14 747       11/1994

OTHER PUBLICATIONS

CMM Stylus Catalog, Q-Mark Manufacturing Inc., Aug. 2009.

(Continued)

*Primary Examiner* — Christopher Fulton
(74) *Attorney, Agent, or Firm* — Salter & Michaelson

(57) ABSTRACT

The invention relates to an intermediate element for the arrangement of a probe pin with respect to the probe pin carrier of a coordinate measuring machine, having a single-piece base body with a probe pin end and a machine end. It is provided here that the machine end is provided with a coupling element and with a means for ensuring a reproducible rotational alignment, and the probe pin end has a bearing face which is inclined in a fixed manner with respect to the axis of the coupling element, is provided on a general ball segment form which is flattened by the bearing face, and is configured with a positively locking means and/or frictional means for the positively locking and/or frictional engagement with a fastening end of the probe pin in contact with the bearing face.

21 Claims, 14 Drawing Sheets

(56) References Cited

U.S. PATENT DOCUMENTS

| | | | |
|---|---|---|---|
| 6,226,884 B1 * | 5/2001 | McMurtry | 33/557 |
| 6,546,643 B2 * | 4/2003 | Lotze et al. | 33/559 |
| 7,100,297 B2 * | 9/2006 | McMurtry et al. | 33/556 |
| 7,415,775 B2 * | 8/2008 | Jordil et al. | 33/559 |
| 8,006,399 B2 * | 8/2011 | Wallace et al. | 33/503 |
| 8,365,426 B2 * | 2/2013 | Ruck | 33/503 |
| 2001/0054237 A1 | 12/2001 | Hidaka et al. | |
| 2006/0101660 A1 | 5/2006 | Takanashi | |
| 2013/0111774 A1 * | 5/2013 | McMurtry et al. | 33/503 |
| 2013/0238272 A1 * | 9/2013 | Chen et al. | 702/95 |

OTHER PUBLICATIONS

Carl Zeiss IMT Corporation Stylus Catalg, Catalog Issue 8, Oct. 20, 2009.

Styli and Accessories Technical Specifications, Renishaw, Issue 12.

\* cited by examiner

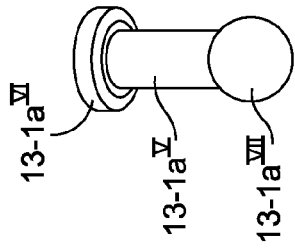
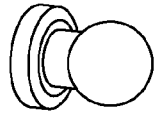
FIG. 15a
FIG. 15b
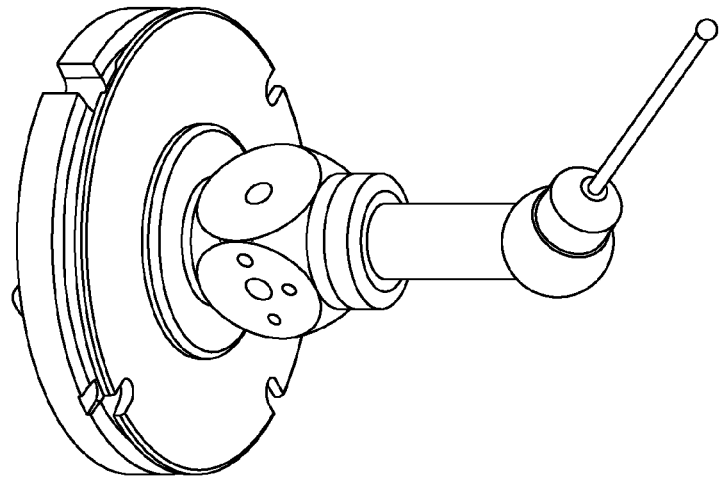
FIG. 14
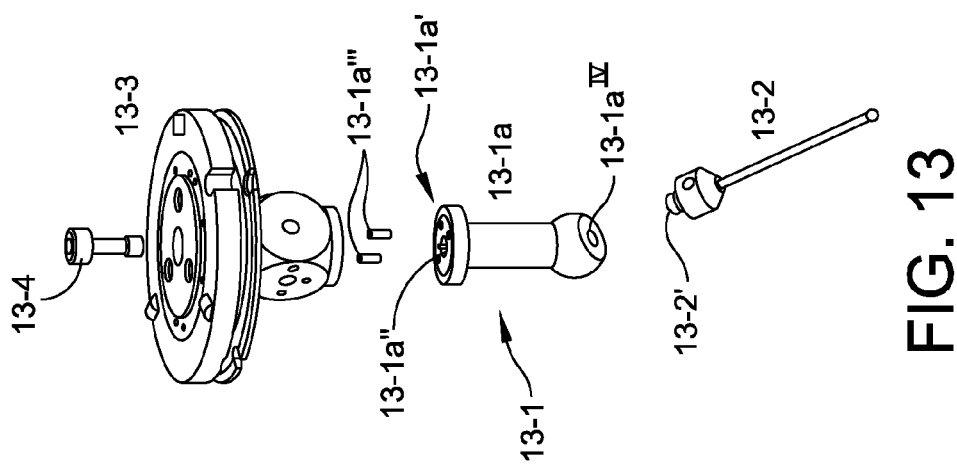
FIG. 13

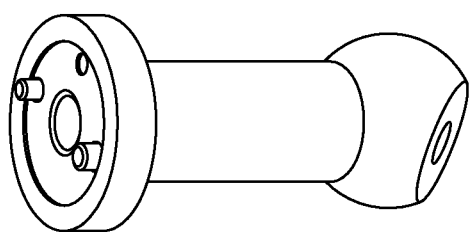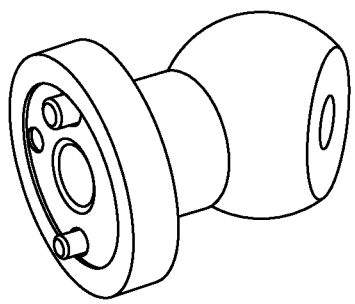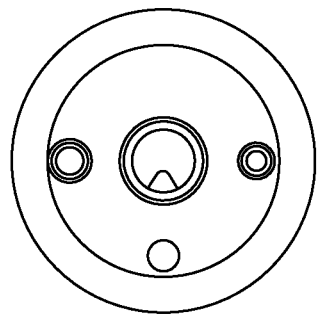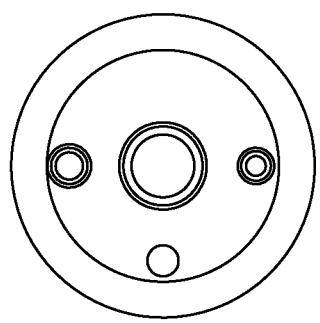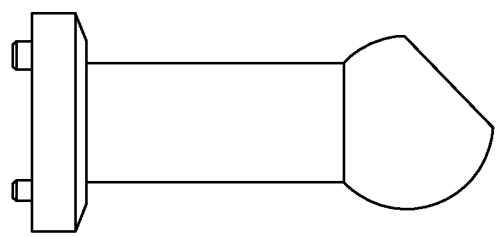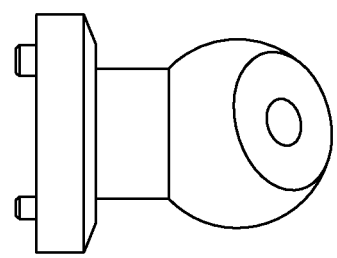
FIG. 16a
FIG. 16b

TRACER PIN ARRANGEMENT

TECHNICAL FIELD

The present invention relates to what is claimed in the preamble and therefore relates to how improvements can be achieved in coordinate measuring machines.

BACKGROUND OF THE INVENTION

Coordinate measuring machines serve to measure workpieces, for example in order to check the dimensional accuracy of workpieces during production. To this end, a probe pin is fastened to a movable arm of the coordinate measuring machine and is therefore guided in contact with the workpiece. The position which the arm has when the probe pin touches the workpiece is ascertained and a surface point on the workpiece is determined therefrom. Conclusions can then be drawn about the surface contour of the workpiece to be measured from a multiplicity of measurements of points sensed in this way. Further measuring methods, in which the surface is measured by way of a coordinate measuring machine, not in a manner which makes contact at points, but rather, for example, in a manner which tracks line by line, are to be mentioned for the sake of completeness. It will be obvious that the arrangement which is described in the following text can be used for all known coordinate measuring machines.

A problem in the case of conventional coordinate measuring machines then consists in that complexly shaped workpieces also have to be sensed, for example engine blocks including the holes which are provided therein. This requires the probe pin to optionally be arranged in an inclined manner with respect to the arm, for instance in order to be introduced into an oblique hole. Here, the required inclination, the spacing of a probe pin tip from the arm, etc. are different from workpiece to workpiece. Spacer and aligning elements have therefore been placed up to now between the work pin carrier on the arm and the probe pin tip which is typically composed of very hard material and can be formed, for example, as a ruby ball. Accordingly, the tip of the probe pin is typically arranged on a suitable, thin rod which can be formed, for example, from carbon fiber reinforced plastic or hard metal, said rod in turn being anchored in a screw-in thread, by way of which the entire probe pin which is formed in this way can be fastened to one intermediate element, designed as spacer or aligning element, or to the arm.

It is then a problem if the probe pin with the small tube axis neither stands perpendicularly on the coordinate measuring machine-side support face of the arm, from which support face the arm rises up slightly upon contact, nor is exactly perpendicular with respect to said bearing face. In a case of this type, it is namely necessary to arrange the probe pin itself in an inclined or pivoted manner with respect to the probe pin carrier of the coordinate measuring machine. Here, inclinations about at least one axis have to be fixed in two directions; this requires the spacer elements to be of suitable configuration.

Probe pins are then subject to wear. Said wear can be a result both of reaming or abrasion on the probe pin ball during scanning measurement and of mechanical destruction, etc. As a result, a change of the probe pins becomes necessary. After a change of this type, the probe pin ball of a new probe pin has to be arranged exactly in the same, reproduced position as previously in the case of the old probe pin, in order to avoid measuring errors. If this is not ensured, the measured values are also no longer reproducible after a change of the probe pin, which possibly results in considerable calibration work. It will be obvious that the probe pin also has to be aligned as previously.

Clamping elements have previously been used to achieve an inclined arrangement, by way of which the pivoted or inclined position of a probe pin receptacle was fixed frictionally. The corresponding arrangements were difficult to set, that is to say imprecise, which is very disruptive, in particular, in the case of a change between different workpieces to be measured and, moreover, entails low reproducibility despite high costs of the element.

It is desirable to provide an option, by way of which probe tips can be arranged obliquely with respect to probe pin carriers of a coordinate measuring machine in a simple, inexpensive and reproducible way.

It is the object of this invention to provide something novel for industrial use.

The solution of this problem is claimed in independent form. Preferred embodiments are found in the subclaims.

SUMMARY OF THE INVENTION

The present invention therefore proposes, in a first basic concept, an intermediate element for the arrangement of a probe pin with respect to the probe pin carrier of a coordinate measuring machine, having a preferably single-piece base body with a probe pin end and a machine end, the machine end being provided with a coupling element and with a means for ensuring a reproducible rotational alignment, and the probe pin end having a bearing face which is inclined in a fixed manner with respect to the axis of the coupling element, is provided on a general ball segment form which is flattened by the bearing face, and is configured with a positively locking means and/or frictional means for the positively locking or frictional engagement with a fastening end of the probe pin in contact with the bearing face.

A first essential aspect of the invention can therefore be seen in the fact that, in order to define the probe pin arrangement, that is to say the alignment here of the probe pin with respect to the probe pin carrier, an inclined bearing face is provided on the intermediate element, against which bearing face the probe pin can be brought into positively locking engagement. A high degree of reproducibility is ensured in this way by the reproducibility of the positively locking connection, even upon a change of the probe pin, since firstly the contact of the probe pin end with the intermediate element defines very accurately by the positively locking connection and secondly the bearing face also ensures a high degree of stability. A bearing face is preferably understood to be inclined when the deviation from a perpendicular to a probe pin axis or from the probe pin axis is more than at least 4°, preferably lies between 10° and 85° or above from 95 to, for example, 120°, in order to correspond to a required setpoint inclination.

It is preferred if the intermediate element is formed with a single-piece base body which is also assigned at any rate fixing elements, for instance for fixing of the swivel coupling element to a counterpiece which is closer to the machine. This allows a very favorable configuration of the entire intermediate element, which in turn makes a rapid and frequent change possible in accordance with a desired inclination and/or rotational alignment. A multiplicity of intermediate elements, for instance as an intermediate element set, can therefore be provided and/or the base bodies can be provided in a dedicated manner for a respective application, which is preferred. The milling of the inclined bearing face from the base body allows very inexpensive production, in particular without requiring additional tools in those firms which make classic use of coordinate measuring machines.

The coupling element is preferably a swivel coupling element.

It is possible and particularly preferred if the swivel coupling element is configured as a journal, about which the bearing face can be rotated. The configuration as journal makes it possible, in addition to the inclination, to also provide a swivel element which can be produced with very low costs. Precisely the combination of a swivel coupling element, which has one of journal hole and journal, with the inclined bearing face affords considerable advantages with regard to the production costs and the prefabrication of blanks. It is to be mentioned that there are various options here. It is particularly preferable if the intermediate element can be pushed at the journal against a surface, via which a region of the intermediate element, which region surrounds the journal radially and is possibly inclined conically, moves away during rotational alignment. This permits repeated adjustment. As an alternative, a one-time swivel element alignment is possible, for example using a journal which is to be adhesively bonded in. The use of a journal of this type by way of adhesive bonding at the site of an end user who has previously predetermined the inclination on an intermediate element by milling is considered to be inventive per se.

If the swivel coupling element is configured as a journal, it is therefore particularly preferable if said journal has a depression or groove, against which clamping means can be pushed, for example in the form of grub screws or the like which press the journal into the journal hole bearing. As an alternative, in the case of a configuration of the swivel coupling element as a journal hole, a receptacle will be provided for clamping means of this type. It is obvious that the machine-side counterpiece will be formed in a correspondingly complementary manner. It is to be mentioned as particularly advantageous to configure spacer pieces for spacing apart machine arm and probe pin in such a way that the complementarily shaped counterpiece for a probe pin swivel coupling element is connected fixedly to the tube or rod element which produces the spacing. This is advantageous because the otherwise required and rather unstable screw connection of the swivel coupling element to a thread-bearing part which is provided on the tube or rod element can be avoided, which increases the stability while reducing the costs. Here, both the correspondingly configured spacer piece and also an overall system which uses said spacer piece (in particular, with the intermediate piece according to the invention for producing the inclination) are considered in each case to be inventive per se and capable of being claimed. Here, a reproducible rotational alignment is then preferably ensured, for example, by non-rotationally symmetrical positively locking means pairs with in each case one pair part on the side of the coordinate measuring machine arm and on the side of the spacer piece.

It is preferred if the swivel coupling element can be pushed against a bearing face, in particular in a frictional connection. It is avoided in this way that, during the insertion of the intermediate element, a rotation occurs during the clamping by fixing said intermediate element to the counterpiece which is closer to the machine. It is readily possible by way of an arrangement of this type to carry out a setting operation which fixes the rotational direction, to bring about the fixing and afterward to bring the probe pin into contact with the bearing face. The positively locking means is preferably formed as a threaded hole which can readily be drilled into the bearing face, in particular perpendicularly. This drilling operation can be performed, in particular, while a semifinished intermediate element to be machined is still clamped in. As an alternative, a milled through hole can be provided instead of a threaded hole. If said milled through hole is formed for guiding through a fastening screw or the like without play, a positively locking definition of the position and, after tightening, a frictional connection are achieved.

Instead of a configuration of the swivel coupling element as a journal which can be (pre-)fixed, for example, by way of grub screws, there are also other options. Thus, for example, the blank can be introduced directly into a receiving opening on a machine-side small tube or rod or can be fixed there, for example by adhesive bonding. If this takes place while a gauge is used, by way of which the, once again machine-side, end of the small tube or rod can be aligned accurately, and correct fastening is ensured by means at the machine-side end of the small tube or rod, such as a journal/journal hole pair which is dimensionally complementary with respect to the fastening point on the machine, even adhesive bonding or the like can also take place in an exactly aligned position in an operating mode which utilizes coordinate measuring machines.

No separate probe pin carrier is therefore used, as is customary, for example, in order to achieve a radial spacing of the probe pin tip from the machine arm, but rather the element according to the invention is used as a part which is connected fixedly but is aligned exactly with respect thereto in terms of rotational direction.

A method is also claimed for producing an intermediate element as described above, in which method blanks are produced with a swivel coupling element and at least one face which is generally parallel to the swivel coupling element axis and the blanks are milled as required in order to produce bearing faces with different inclinations, a respective threaded hole being made perpendicularly the bearing face, in particular after milling. It is obvious that the swivel coupling element is preferably formed here for a reproducible alignment with respect to the machine arm.

Face milling is preferably used as milling method, to which end the workpiece is clamped into an angle holder or the like and/or is placed on the latter, with the result that face milling operations are performed at the correct angle by way of the definition of the support face. Either dedicated metal parts or the like can be used as angle holders or supports for face milling can be used, or else an adjustable holder. The use of an adjustable holder affords advantages in comparison with the case, in which an individual intermediate element would have to be adjustable and therefore, with the same costs, allows the use of a possibly also more complicated face milling holder.

A blank is typically provided which is spherical or circular segment-shaped before the milling in the region of the support face to be formed, which makes a constantly large support face possible independently of the angle of inclination. After milling, the support face will typically correspond largely exactly to the support face of the probe pin fastening end and will otherwise be (circularly) round. However, the sphericity does not necessarily have to be completely and wholly round, which permits low production costs. The blank is otherwise typically configured opposite the support face to be formed and parallel to the coupling element axis with a planar face for support on the angle holder, the clamping tool for the face milling or the like. This can also facilitate the alignment of the rotational position.

DESCRIPTION OF THE DRAWINGS

In the following text, the invention will be described only by way of example using the drawings, in which.

For the sake of improved clarity, it should already be mentioned here that the text below describes further improvements by way of example with reference to FIG. 11 which shows a sectional view through the transition region of support means and adapter, and FIG. 12 which shows a probe pin fastening means for a coordinate measuring machine, in accordance with FIG. 3.

In addition, the following are likewise to already be mentioned:

FIG. 13 which shows an exploded view of a probe pin fastening means for a coordinate measuring machine with a variant of the intermediate element according to the invention, FIG. 14 which shows the arrangement from FIG. 13 in the assembled state, FIGS. 15a, b which show blanks for the intermediate element according to the invention of FIGS. 13 and 14, and FIGS. 16a, b which show the intermediate element of FIGS. 15a and 15b after production of the bearing face.

DETAILED DESCRIPTION

Figure 1:
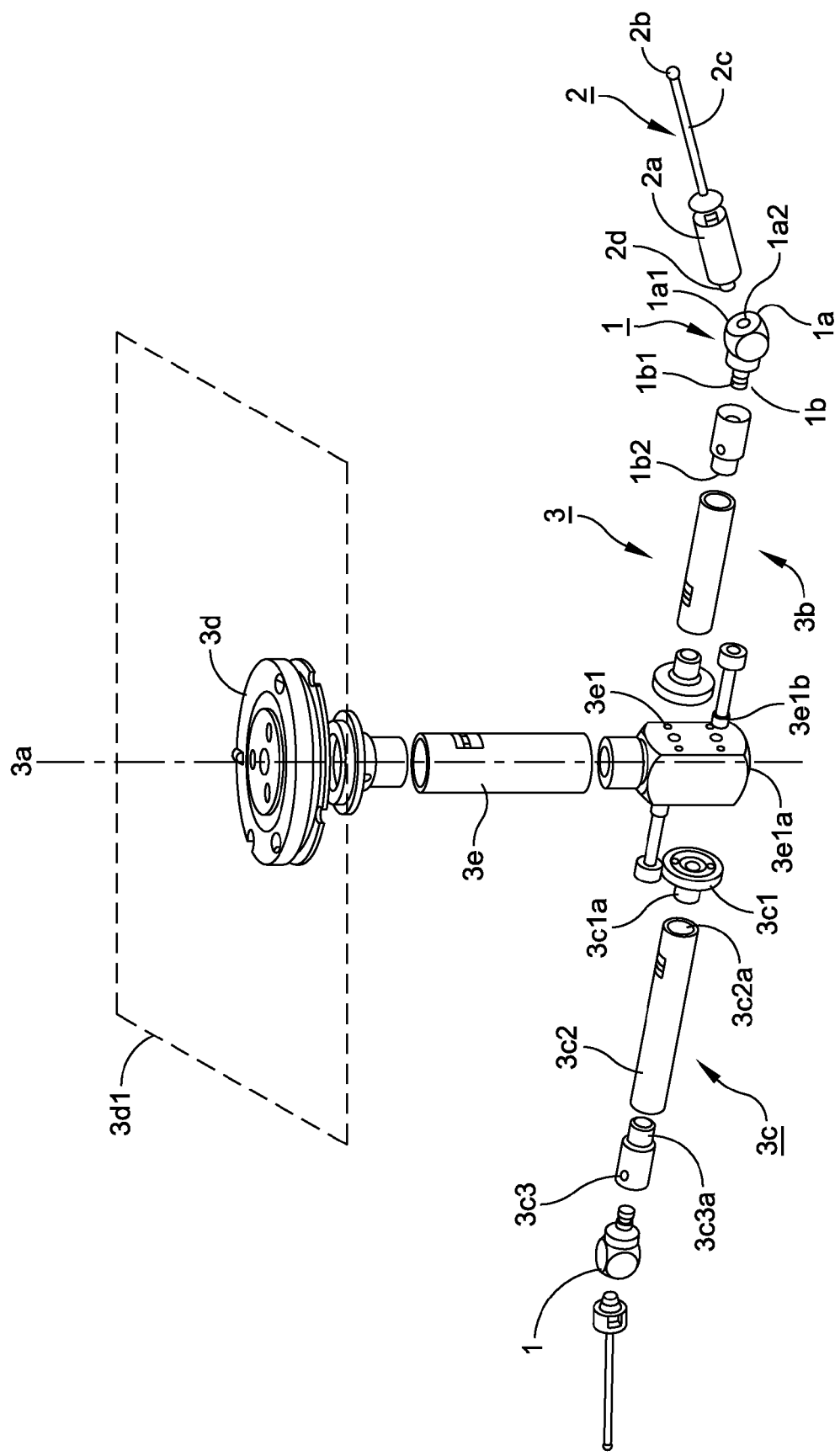
FIG. 1 shows an exploded view of the probe pin fastening means for a coordinate measuring machine having an intermediate element according to the invention.
Figure 2:
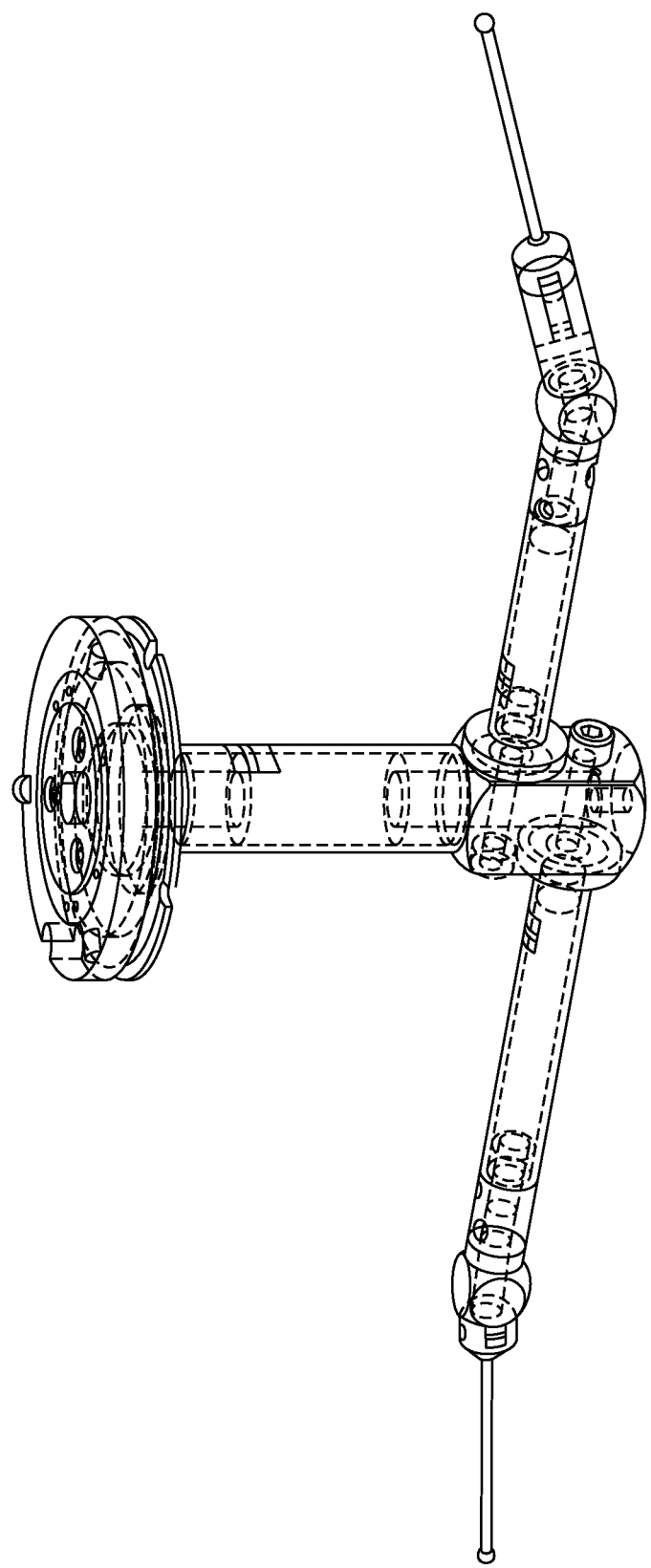
FIG. 2 shows the arrangement from FIG. 1 in the assembled, partially transparent state.

According to FIG. 1, an intermediate element, denoted generally by 1, for the arrangement of a probe pin 2 with respect to the probe pin carrier 3 of a coordinate measuring machine (not shown) a probe pin end 1a and a machine end 1b, the machine end 1b being provided with a swivel coupling element 1b1 and the probe pin end 1a being configured with a bearing face 1a1, which is inclined with respect to the swivel coupling axis 1b2, and a positively locking means lag for the positively locking engagement with a fastening end 2a of the test pin 2 in contact with the bearing face 1a1.

In the present case, the probe pin carrier 3 has projections 3b, 3c which project in a generally opposite radial manner from a coordinate measuring machine arm axis 3a. Toward the coordinate measuring machine, the coordinate measuring machine arm is provided with a disk-like plate 3d which is configured for reacting to the contact of a workpiece (not shown) with a probe tip 2d and for generating a signal if the disk-like plate 3d is raised out of the plane 3d1, which can take place as a result of pressure in the axial direction of the axis 3a or by pressure transversely with respect thereto.

Figure 7:
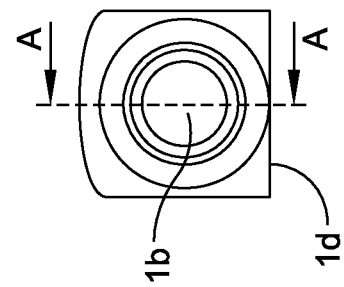
FIG. 7 shows a section through an arrangement to be produced with an intermediate element and a machine-side counterpiece.
Figure 7:
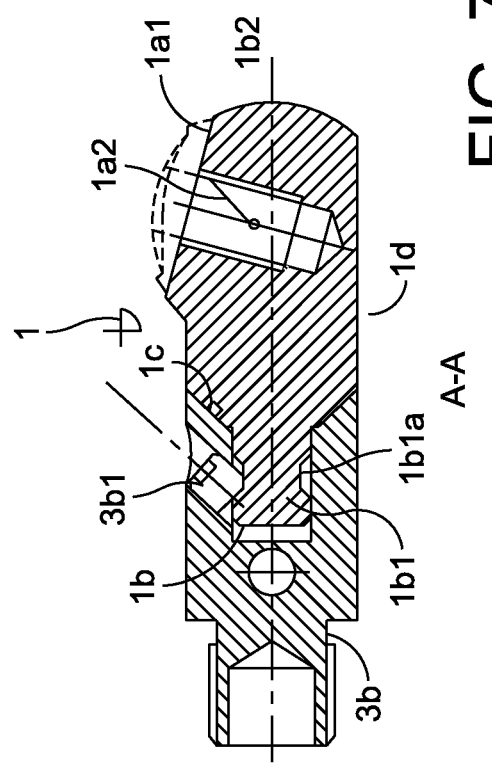

In the present exemplary embodiment, the probe pin 2 has a probe tip 2b which is formed here with an aluminum oxide ball, for example a ruby ball, the ball 2b being formed on a rod 2c made from sufficiently rigid and temperature-insensitive material 2c, that is to say expands at any rate marginally with temperature changes, such as hard metal, ceramic or carbon fiber composite material (CFC). The rod is in turn arranged on a metallic thickened portion 2a, for example made from stainless steel or tool steel or titanium, which has a thread 2d on the machine side, which thread 2d is provided with a threaded hole 1a2 for the positively locking engagement. The threaded hole 1a2 is drilled perpendicularly into the bearing face 1a1 in the intermediate element 1, cf. FIG. 7.

Figure 4:
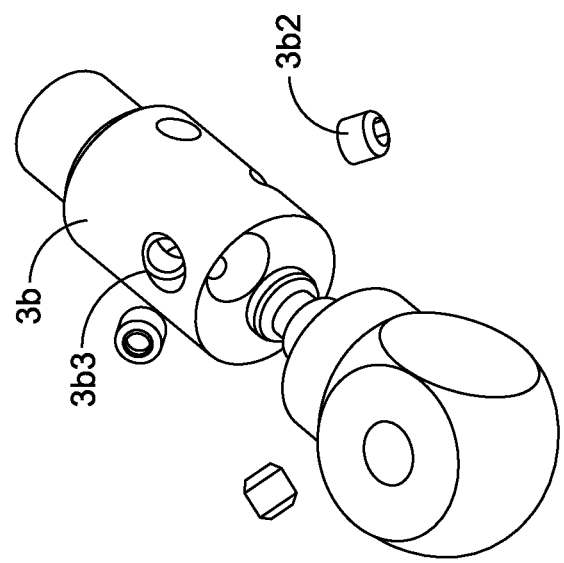
FIG. 4 shows a first illustration of the intermediate element of the present invention in an exploded view with a machine-side counterpiece.
Figure 5:
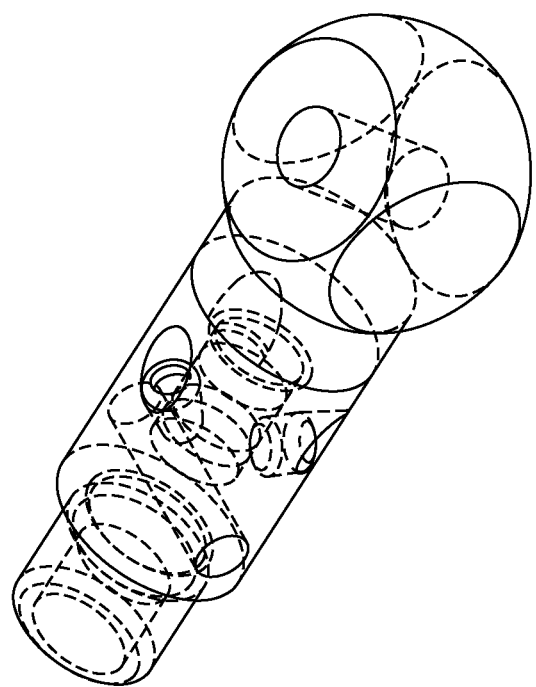
FIG. 5 shows a view of the elements of FIG. 4 in the assembled, partially transparent state.
Figure 6:
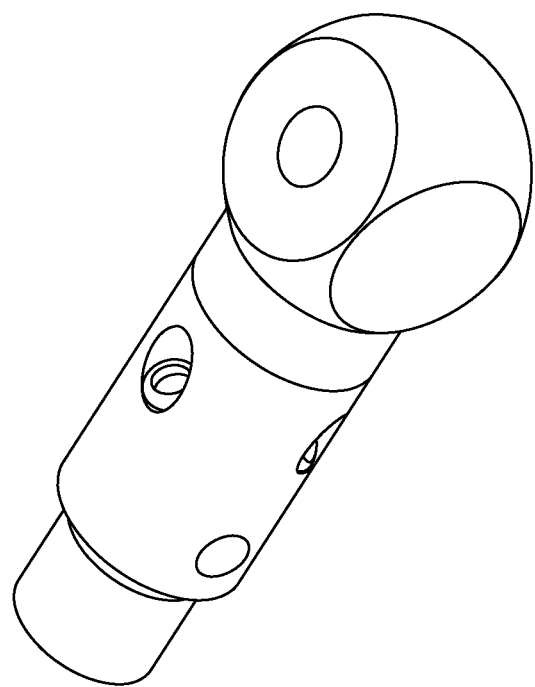
FIG. 6 shows the parts of FIGS. 4 and 5 in the non-transparent state.

As can be seen from FIG. 1, the intermediate element 1 is arranged on an element which protrudes radially from an arm projection 3e, said element having, toward the intermediate element 1 of the present invention, a receptacle for the journal 1b which forms the swivel coupling element 1b. The journal 1b is provided with a circumferential groove 1b1a which in turn is beveled on its flanks 1b1b in such a way that a pushing means 3b1 which is provided in the counterpiece 3b can be pushed into the swivel journal receptacle, in the form of a grub screw 3b2 here, cf. FIG. 4, which penetrates into a corresponding thread 3b3. The intermediate element 1 is provided with an oblique shoulder 1c which runs around the circumference and is provided around the journal receptacle on a complementarily formed bearing face in the counterpiece 3b. The counterpiece 3b for fastening the intermediate element 1 according to the invention is formed from metal here and, on the machine end side here, has an adhesive bonding face which matches a GFRP or CFRP pipe and is sufficiently temperature-stable. Any desired customary machine-side parts can be provided here. The intermediate element 1 has a flat rear face 1d, cf. FIG. 7, which is provided generally on the opposite side of the bearing face 1a1 and lies generally parallel to the axis 1b2 of the swivel coupling journal 1b.

That end of the intermediate element 1 on the probe pin side is rounded around the bearing face, a blank having a general ball segment shape in the region of the future bearing face. Here, the corresponding ball segment region of the corresponding blank shape is such that the ball or the ball segment which can be milled off in order to form the support face 1a1 can be formed with an inclination away from the machine arm and also toward it. In other words, the center point of the ball radius lies spaced apart somewhat from the swivel coupling element axis, as indicated by radius r in FIG. 7. Here, the blank is dimensioned in the ball segment region in such a way that a support face for the probe pin is formed by milling, having that diameter which is required for the probe pin as support face.

Here, the threaded hole 1a2 is a standard threaded hole for standard threads of probe pins; the support face around said threaded hole is of planar design in the present case, in accordance with the customary probe pin shape around the thread.

Figure 8:
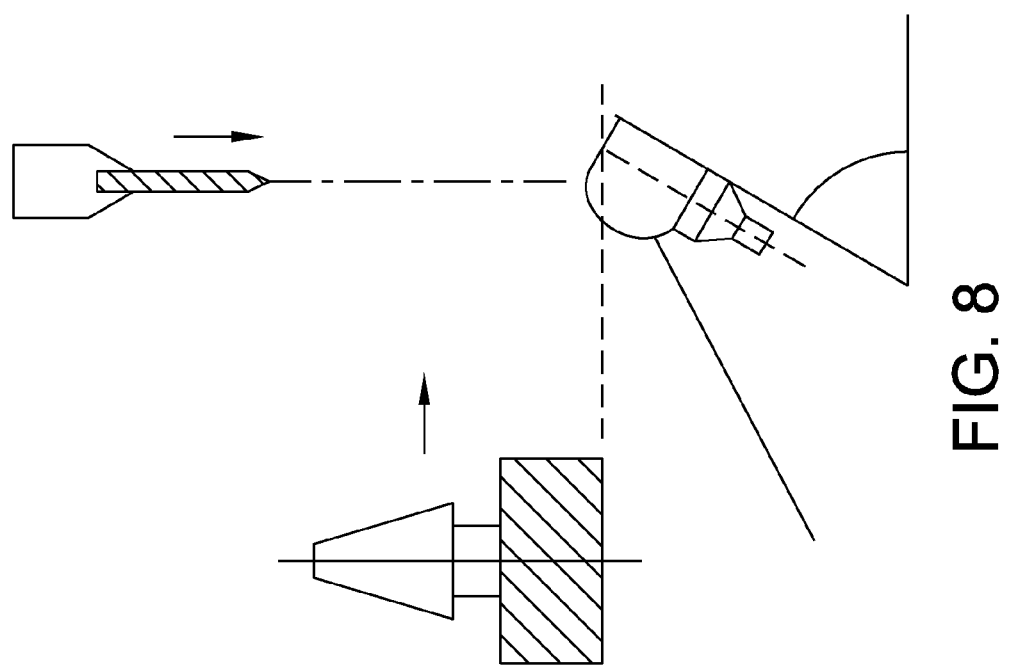
FIG. 8 shows two machining steps to be carried out successively during the production in a diagrammatically indicated form, namely the face milling of the blank which is attached on an oblique support and the subsequent drilling of said blank perpendicularly into the bearing face.

The arrangement is used as follows:

First of all, intermediate element blanks are produced which have a grooved swivel coupling element journal, a flat support face 1d and a region in the shape of a spherical cap, from which the bearing face for a probe pin which is arranged in an inclined manner with respect to a probe pin carrier 3 of a coordinate measuring machine can be formed by milling. Said blanks are produced in a series-like manner identically in relatively large quantities and are sent to users of a coordinate measuring machine. There, a desired probe pin geometry is determined for a suitable given measuring task, which typically takes place using CAD programs. The intermediate elements can be defined readily here as CAD elements. In accordance with the task-specific or application-specific definition of the angle of inclination, an angle holder gauge is then prepared, into or onto which an individual blank or a multiplicity of identical blanks is inserted or placed, and face milling is carried out for the partial removal of the spherical cap until the desired angle of inclination. Threaded holes are then introduced perpendicularly into the flat faces which are formed in this way. As a result of the use of a suitable angle holder, this is possible without great outlay in apparatus terms, cf. FIG. 8.

Afterward, the finished intermediate element can first of all be inserted on the machine end side into the journal receptacle, can be aligned, and afterward can be pushed in a clamping or frictional manner into the desired position by the grub screws which are distributed equidistantly around the circumference, for example, by three grub screws here. Here, the rotational alignment itself takes place with only a small amount of force, as long as the screws are not yet tightened. The setting can therefore be performed with high accuracy. Correct alignment is possible without problems by way of successive tightening of the grub screws.

Figure 9:
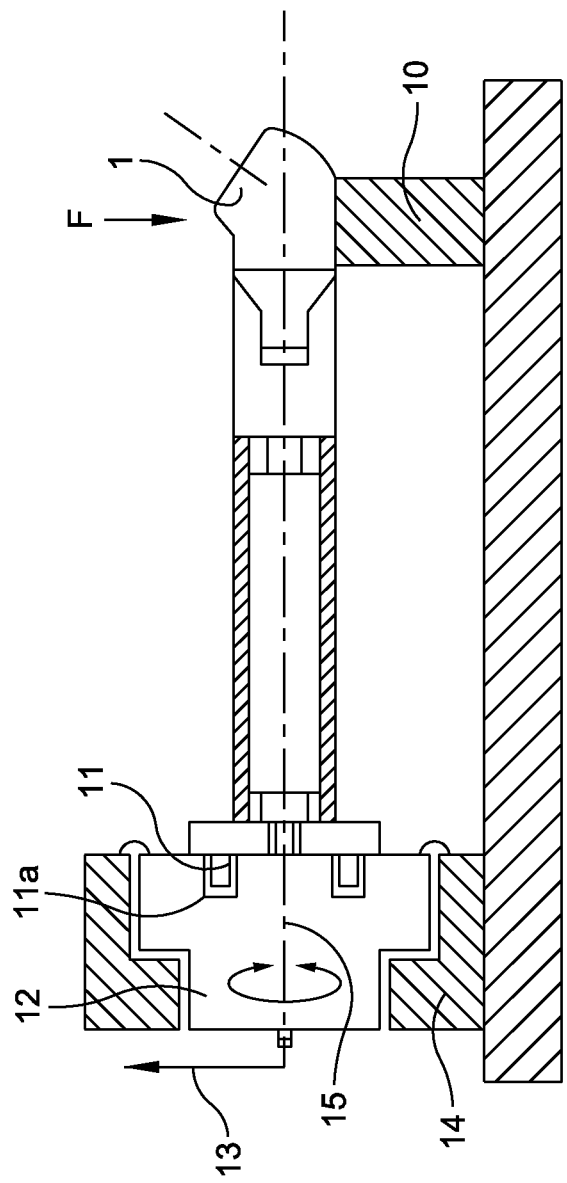
FIG. 9 shows an angle gauge for the rotational alignment of the intermediate element with a cut-open tube.

FIG. 9 shows that the element 3c can be inserted into a rotary gauge which firstly exactly defines the position of a flattened portion on the intermediate element 1 by way of a support 10 and secondly exactly fixes the position of the intermediate piece 3c, even with regard to the rotational alignment, via a complementary shaping means 11 with journal/journal hole pair such as on the machine arm at 3e1a and 3e1b.

Here, the gauge is formed in such a way that the receptacle 11a for the journals on the support means 3c1 of the spacer piece 3c is provided here in a rotatable element 12 which can be rotated practically without play; it can be set exactly by means of a pointer 13 which can move and is driven over an angle scale which is attached around the circumference. It goes without saying that the body 12 which is shown in cross section and its support 14 can be rotated relative to one another, that is to say there is rotational symmetry about the indicated axis 15 to this extent.

Afterward, if desired, fixing of the rotational position can also be performed beyond that dimension which is already ensured by the grub screws. This can take place, for example, by means of adhesive. To this end, in a deviation from what is described above, adhesive, for example, can be introduced into the region between the intermediate element and the receptacle; an adhesive will be selected which cures more slowly than the time which is required to set the rotational alignment; as an alternative, an adhesive can be used which, for example, cures only under heat, it being possible for the arrangement to be heated after alignment of the rotational position, for instance by means of a warm air fan.

As an alternative or in addition, it is possible to provide other connecting methods, such as WIG welding or the like at one or more points around the circumference of the intermediate element/receiving piece transition region. As an alternative and/or in addition, a hole can also be made through the element 3b as far as into the intermediate element by means of a simple, for example battery-operated, small drill, and a probe pin or the like can then be inserted. This also ensures the fixing of the rotational direction.

For a swivel coupling element of the present invention, it can therefore already be sufficient, depending on the desire of the applicant, if a one-off rotational alignment is made possible and otherwise machine attachment which reproduces the rotational direction is ensured.

The probe pin is subsequently screwed in, which then has an exactly defined desired inclination.

It is to be noted that the region around the swivel coupling element journal can possibly be provided with markings which facilitate a rotational alignment relative to the receptacle on the machine end side, if a corresponding marking is likewise provided there. For example, a 5° or 10° graduation can readily be provided on the blank. The machine-side receptacle can likewise have a marking, for example in a nonius-like manner.

It is to be mentioned that the machine-side region can possibly also be formed as a round cylinder with a flattened portion which corresponds with a corresponding flattened portion on the machine-side receptacle. This allows an alignment of the rotational position to be ensured by simply bringing the flattened portions into alignment with one another. For example, in a similar manner to the inclination, the flattened portion can likewise be brought about by face milling on a suitable base with respect to the production gauge.

This is appropriate if it is ensured that the machine-side flattened portion on the pin carrier 3 for its part has a reproducible alignment with respect to the coordinate measuring machine arm axis. Although this is not readily ensured, advantages can nevertheless already be achieved by the present invention if this is not ensured; a flattened portion can also still be advantageous when at least the intermediate elements are formed in each case with an identically situated flattened portion because, independently of the absolute position relative to the coordinate measuring machine arm axis, reproducibility is then ensured at least until a change of the pin carrier 3.

However, it is also possible and preferred by way of simple means, even if it is not necessary, even if the rotational alignment of the intermediate element is still fixed precisely. The invention exhibits different measures for this purpose. As is shown in FIG. 1 and has been described previously, the probe pin carrier has two projections 3b, 3c which protrude radially from a coordinate measuring machine arm axis 3a; the fact that two projections of this type are shown on one arm in FIG. 1 is otherwise only exemplary and not necessary, and fewer or more projections can also be provided. It is then important that, as is to be explained by way of example using the element 3c, the projections are typically formed in multiple pieces, namely as a rule with a machine-arm-side support means 3c1 which rests on a machine-arm-side support face, shown for the projection 3b as support face 3e1, merges into a spacer piece 3c2 away from the coordinate measuring machine arm axis, and is connected fixedly to said spacer piece 3c2, the receptacle 3c3 for the intermediate element of the present invention being provided in turn on the spacer piece 3c2 toward the probe pin. The receptacle 3c3 and the support means 3c1 are typically formed from tool steel, stainless steel or the like, whereas the spacer piece 3c2 can be composed of titanium, tool steel, hard metal, carbon fiber composite materials, glass fiber composite materials and the like.

Different methods are then customary in the prior art for connecting the spacer piece 3c2 to the support means 3c1 or the receptacle 3c3. Firstly, there is the option to make holes in the spacer piece 3c2 and to provide the receptacle 3c3 or the support means 3c1 with journals or the like 3c3a or 3c1a which penetrate into the respective holes, indicated at 3c2a, and, for example, are bonded adhesively to the latter. Although an adhesive bond of this type is generally less preferred for reasons of stability, it affords the advantage for the application of the invention that the elements 3c1, 3c2 and 3c3 which are to be connected to one another can be moved and, in particular, can be rotated readily with respect to one another until the adhesive cures. If two complementary journal holes $3e1a$, $3e1b$ are then provided on the support face $3e1$ of the machine arm and the support means $3c1$ are equipped with complementary journals which penetrate without play or virtually without play into the journal holes $3e1a$, $3e1b$, the result is a defined, reproducible rotational alignment of the rigid spacer piece $3c$. This can be utilized, in the case of the connection of the elements $3c1$, $3c2$ and $3c3$, to achieve a correct and reproducible angle position of a flattened portion on the machine end side as described above in the machine-side receptacle $3c3$. To this end, for example, first of all the spacer piece $3c2$ is adhesively bonded fixedly to the support means $3c1$ and afterward is clamped in a gauge which firstly ensures an exact alignment of the flattened portion of the receptacle $3c3$ and secondly makes it possible that a correct position is achieved in a plugged into one another position of the receptacle $3c3$ and spacer piece $3c2$. This is advantageous when it is ensured that a defined rotational alignment regularly occurs very often at an end user, with the result that work can be carried out with spacer pieces which are fixed to this extent.

It is to prove advantageous that here, as can be seen, the spacer piece $3c2$ and receptacle $3c3$ are connected directly to the journals of the intermediate piece which serve to push the swivel coupling element in pushing means which serve as journal hole.

If, which is preferred for reasons of higher quality, the connection of the spacer piece $3c2$ to firstly the receptacle $3c3$ and secondly the support means $3c1$ is not to be carried out by simple adhesive bonding, but rather by cutting threads, a rotational alignment of this type is not readily possible during production. However, there is the possibility here to first of all produce the connection fixedly between the elements $3c1$, $3c2$ and $3c3$ and then only subsequently to machine the support face into the receptacle $3c3$, which in turn to produce a suitable gauge by milling, in which gauge a reproducible position is ensured by way of the journal position of the journals of the support means $3c1$. Otherwise, it is to be mentioned that, instead of journals in the support means $3c1$ and journal holes in the counterpiece, the complementary reversed situation could also be used, or other suitable means and measures can be provided which make easy reproducibility of a rotational alignment possible.

A spacer piece $3c$ which is provided in a desired alignment with a cut tube as described above can then be inserted into a gauge, as shown in FIG. 9, to achieve a correct rotational alignment.

Figure 10:
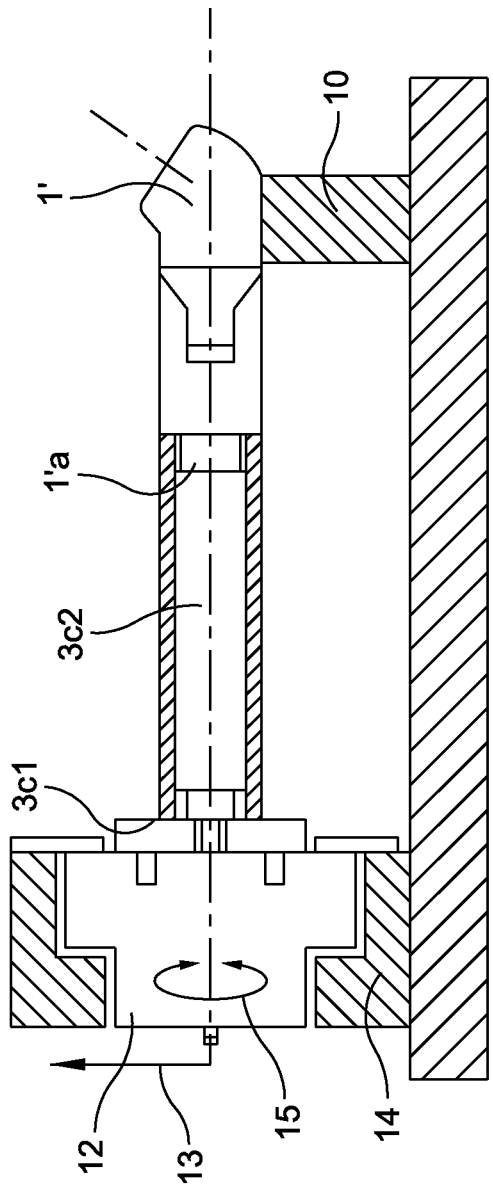
FIG. 10 shows a gauge for adhesively bonding an intermediate element according to the invention directly into a spacer piece.

A gauge similarly to that in FIG. 9 can also be used if, which is optionally possible in the case of lower quality requirements, direct adhesive bonding of the intermediate element 1 to the spacer piece $3c2$ which is tubular here is to take place. To this end, FIG. 10 shows an intermediate element 1' which is received with an accurate fit in the tube $3c2$ via a simple, rotationally symmetrical journal $1'a$. Although this embodiment is possibly not quite as stable as the one described above, it is even less expensive, just on account of the simplification with respect to the above-described exemplary embodiments by way of the omission of the clamping fit with grub screws and the like.

Accordingly, the above text has therefore described an intermediate element for the arrangement of a probe pin in an inclined manner with respect to the probe pin carrier of a coordinate measuring machine, having a probe pin end and a machine end, the machine end being configured with a swivel coupling element and the probe pin end being configured with a bearing face which is inclined with respect to the swivel coupling axis and with a positively locking or frictional means for the positively locking and/or frictional engagement with a fastening end of the probe pin in contact with the bearing face.

Furthermore, an intermediate element as specified in the preceding variant has been described, which intermediate element is formed with a single-piece base body.

Furthermore, an intermediate element as specified in one of the preceding variants has been described, the inclined bearing face being milled off from the base body.

Furthermore, an intermediate element as specified in one of the preceding variants has been described, the swivel coupling element being designed as a journal which is configured for being received in a journal bearing, preferably as a journal which can be adhesively bonded into a journal hole receptacle.

Furthermore, an intermediate element as specified in one of the preceding variants has been described, the journal having a depression, preferably a groove, by way of which the intermediate element can be pushed against a bearing face by a fixing means.

Furthermore, an intermediate element as specified in one of the preceding variants has been described, the positively locking or frictional means being formed as a threaded hole, into which the probe pin can be screwed.

Furthermore, an intermediate element as specified in one of the preceding variants has been described, the threaded hole being drilled perpendicularly into the bearing face.

Furthermore, a method has been described for producing a multiplicity of intermediate elements as specified in one of the preceding variants, blanks being produced with a swivel coupling element and at least one face which is generally parallel to the swivel coupling element axis, and the blanks being milled as required in order to produce bearing faces of different inclination, a respective threaded hole or a milled through hole for a fastening screw being introduced, in particular after milling, perpendicularly the bearing face.

Furthermore, a method as specified in the preceding variant has been described, the blank being clamped and/or placed in an angle holder and then being face milled.

Furthermore, a method as specified in one of the preceding variants has been described, a blank being provided which, before milling, is generally spherical in the region of the bearing face to be formed.

Furthermore, a blank has been described for carrying out a method as specified in one of the preceding variants.

Furthermore, a spacer piece has been described for receiving the blank which has been machined further, having means for pushing the possibly machined blank into a position which fixes the rotational direction and/or having a receptacle for receiving the possibly machined blank in an adhesive bond which fixes the rotational direction.

While a patentable invention has already been disclosed from the above text, further improvements are possible. The latter will be described in the following text, without, as a result, impairing or calling into question the patentability of the above text per se and of subjects and methods by combination of only features which are disclosed above.

In the case of the attachment of intermediate elements which bear inclined probe pins, their correct alignment is to be brought about, as has been explained. A correct alignment therefore also has to be ensured between an adapter from the coordinate measuring machine arm to the probe pin and its support means on the adapter.

It is to be noted here that the probe pins are to be changed regularly and it also has to be ensured permanently, in particular despite a multiplicity of changes, that a correct arrangement is obtained.

As has been described, a support means is provided for probe pin fastening, which support means bears, for example, a metal, carbon, ceramic or other tube which in turn is connected to elements which are specified as above and bring about the probe pin inclination. If said support means is not aligned correctly with respect to the adapter, the desired correct alignment of the probe pin does not result.

The present improvement aims by way of the aspect which is now being described at further facilitating the correct alignment.

The achievement of this object is claimed in independent form. Preferred embodiments are found in the subclaims.

In a first basic concept of the improvement, the present invention therefore proposes a support means for attaching a probe pin to an adapter pin, which probe pin is provided, in particular, on an intermediate element as specified in the preceding text. It is provided here that the support means has positively locking elements which are free from pressing force for the unambiguous orientation of the support means on their positively locking connection which is free of pressing forces with complementary elements on the adapter.

An essential basic concept of the improvement therefore consists in it firstly being possible to ensure a correct orientation of the support means, and therefore of the probe pin which is supported by way of it, by way of positively locking elements which admittedly make an unambiguous orientation possible, that is to say, in particular, are not rotationally symmetrical, but secondly to ensure that the positively locking elements remain free from pressing forces when being supported on the adapter. This ensures that the positively locking elements are not loaded and deformed by possibly high pressing pressure and therefore become faulty, inaccurate and/or unusable.

It is possible and preferred that at least two differently shaped positively locking elements are provided which interact with respective complementary elements on the adapter. A particularly simple orientation is possible by virtue of the fact that differently shaped positively locking elements are used, which makes fault-free, correct and therefore reproducible probe pin mounting possible, even when under great working stress.

The differently shaped positively locking elements will preferably interact with their respective complementary element in such a way that they come into engagement one after another, in particular by way of projections which protrude to different extents. Therefore, first of all the first positively locking element/complementary element pair passes into engagement, and then only after this the second said pair. This is advantageous because canting which is caused by tilted approach with respect to the plug-on axis, with the risk of damage to the positively locking elements, can rather be avoided in this way, for example by rounding off or beveling of the projections.

It is otherwise to be noted that the projections which protrude to different extents can be provided on possibly the support means and/or the adapter. However, it is further to be noted that, regardless of this, projections on the support means are primarily addressed in the following text; however, this is not intended to restrict the disclosure, but rather to facilitate the comprehension of the disclosure, by the respective positively locking element/complementary element pairing alternatives not being mentioned and explained again in the case of each opportunity which arises, but rather being assumed to always be present in accordance with the above text in an obvious way.

It is preferred if at least that positively locking element which is the first to come into engagement with its complementary element on the adapter is a round element which forms a round journal/round hole pair with its assigned complementary element. This allows an engagement of the round journal/round hole pair which protrudes further to first of all be brought about upon plugging of the support means onto the adapter, and then to bring about a rotational adjustment of the support means about the axis of the round journal/round hole pair with gradual approaching with an at any rate low pressure between the support means and the adapter, to be precise until the engagement of the further positively locking element or elements/complementary element or elements on the support means and the adapter, and only after this to bring about the fixed connection in the correct alignment, which is then easily possible.

It is preferred if at least two positively locking elements form round journal/round hole pairs with the respectively assigned complementary elements and both round journal/round hole pairs in each case have a different diameter. The configuration of also the second positively locking element/complementary element pair as a round journal/round hole pair has advantages in terms of production technology on account of the simple producibility of the geometric shapes, and thus reduces the costs.

The support means is preferably screwed to the adapter, to which end a threaded hole which serves for fastening is preferably provided in the support means, into which threaded hole a screw which runs through the adapter can pass. In order that said screw can be held captively on the adapter without problems, the adapter can have a threaded hole for screw securing, through which threaded hole the fastening screw which is provided with a thread only in its front region can be screwed. If said securing threaded hole is arranged on the adapter close to the interface to the support means, it is preferred if the fastening threaded hole is depressed in the support means to such an extent that it is possible to seat the support means on the adapter before the screw engages.

It is preferred if pressing faces are provided for pressing the support means against the adapter in a defined manner, in particular are provided as projections or as a single, circumferential projection, the faces of this type being arranged, in particular, close to the edge on the support means.

Protection is also claimed for an adapter which is designed specifically for use with the support means and for a probe pin with intermediate element as already specified in the preceding text, which probe pin is provided with a support means in accordance with the present additional application.

Figure 3:
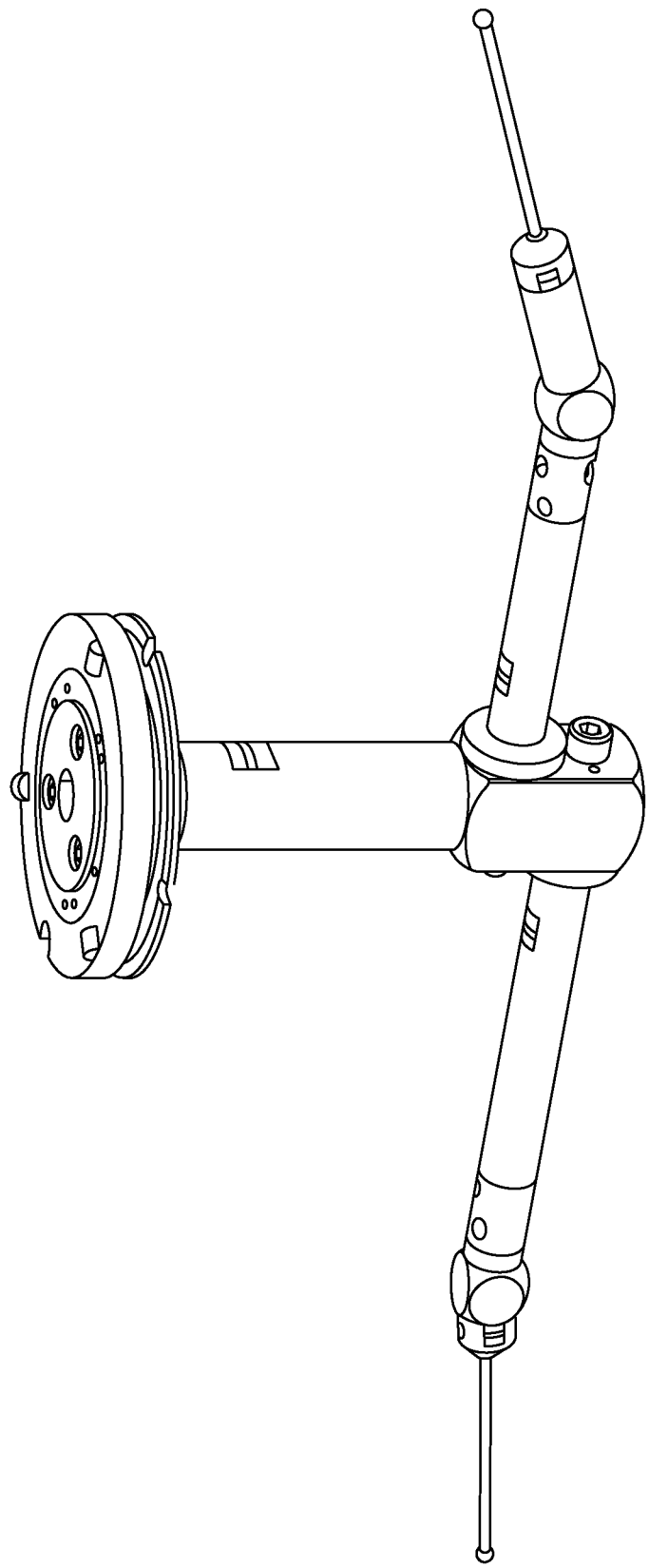
FIG. 3 shows the arrangement of FIG. 1 in the assembled state.
Figure 11:
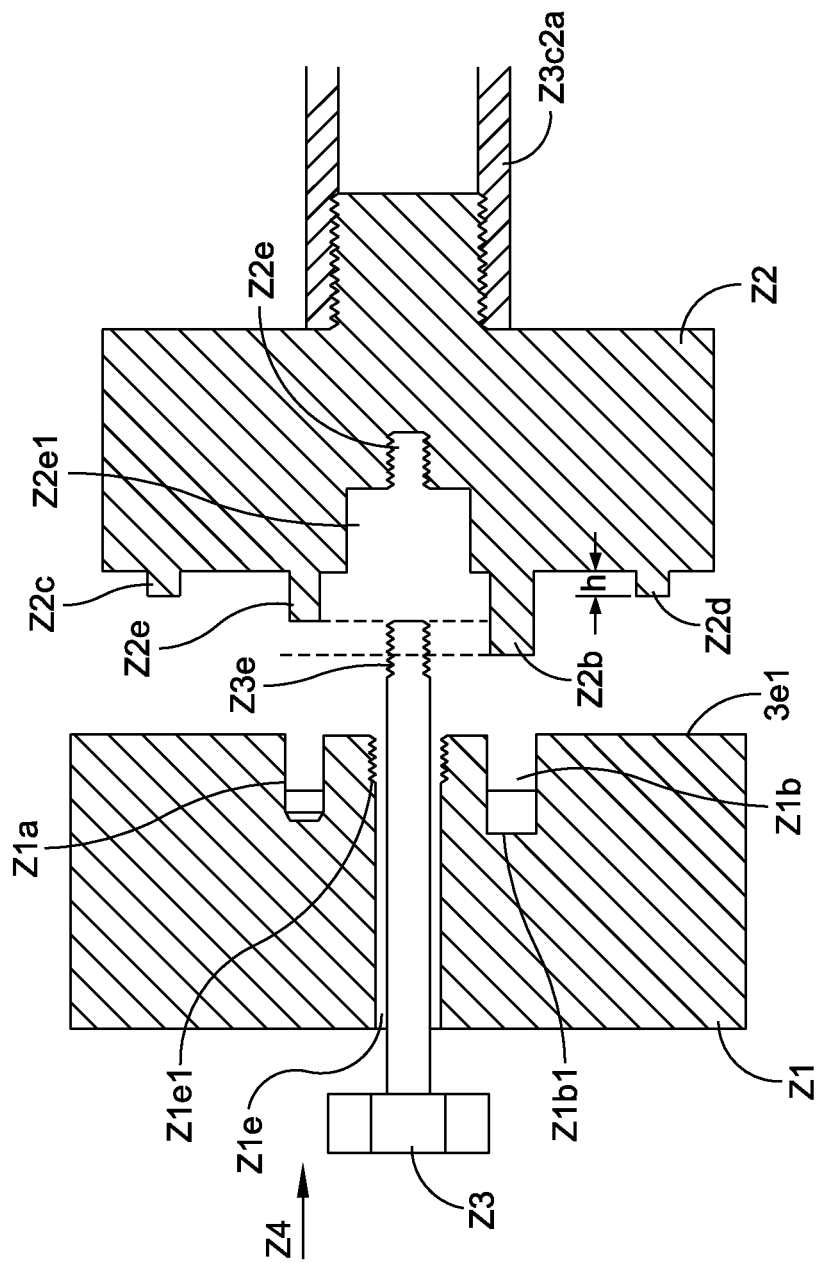
Figure 12:
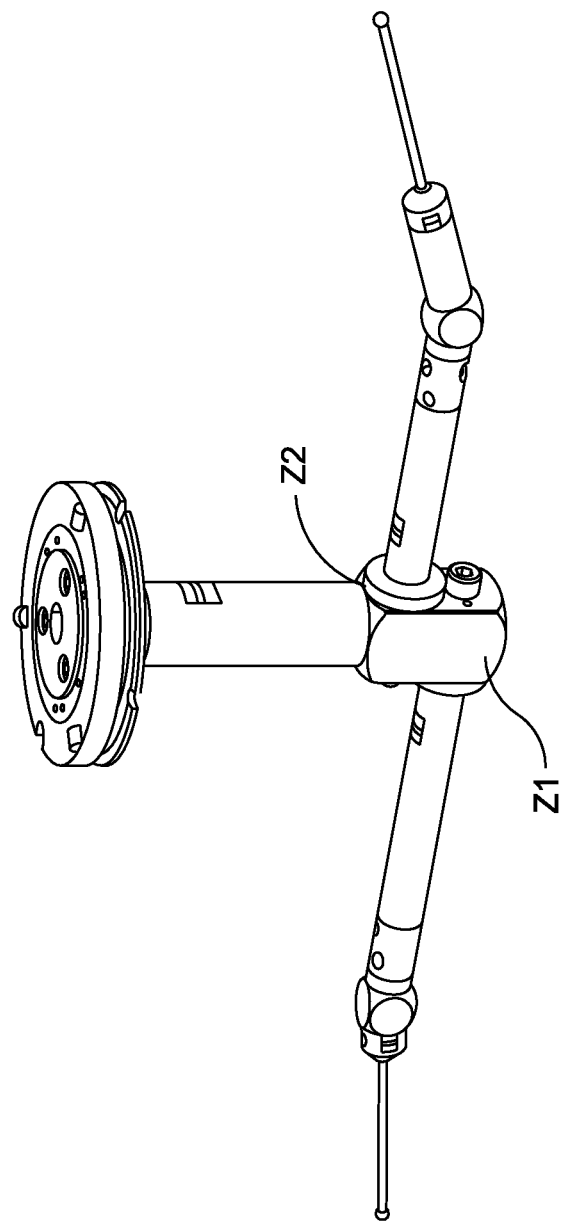

The improvement will be described in the following text only by way of example with reference to the drawing, in which:

FIG. 11 shows a sectional view through the transition region of the support means and the adapter, and FIG. 12 shows a probe pin fastening means for a coordinate measuring machine, in accordance with FIG. 3 of the main application.

In FIG. 12, the adapter is denoted as Z1, and the support means is denoted as Z2. The function and arrangement of the further parts which are shown are evident to a person skilled in the art from the corresponding description of the figures as already specified in the preceding text, in so far as this is required at all.

According to FIG. 11, the support means Z2 is provided, in order to fasten a probe pin to an adapter Z1, which probe pin can be arranged, in particular, on an intermediate element as already specified in the preceding text, and of which probe pin only a part, denoted by designation 3c2a, of a hollow tube is shown in the present case, which tube is adhesively bonded on a projection of the support means or is attached in another manner as described in what has already been specified in the preceding text.

The support means Z2 has positively locking elements Z2a, Z2b which, for the unambiguous orientation of the support means in the case of a positively locking connection with complementary positively locking elements Z1a, Z1b, are formed on the adapter Z1 in such a way that they can enter into a positively locking connection in a manner which is free from pressing forces.

In the present case, as can be seen from FIG. 12, the support means Z2 is formed as a generally round element, a circumferential projection Z2c in the direction of the adapter being provided close to the outer circumference of that side of the support means face which faces the adapter, which projection Z2c protrudes by a height h beyond the surface Z2d which faces the adapter Z1.

The journals Z2a and Z2b are both round journals, just as the complementary journal holes Z1a, Z1b in the adapter are round holes. The journals Z2b and Z2a have different diameters, with the result that the journal Z2b cannot be placed into the journal hole Z1a and, conversely, the journal Z2a would exhibit great play in the journal hole Z1b. Moreover, the thicker journal Z2b extends further away, in comparison with the journal Z2a, from that surface of the support means Z2 which faces the adapter Z1, by a spacing which is noticeable upon positioning. The journal hole Z1b is deeper than is required to receive the journal Z2b. In other words, the end face of the journal Z2b does not protrude as far as to the journal hole bottom Z1b1 of the journal Z1b. The same applies to the depth of the journal hole Z1a which is greater than the height of the journal Z2a above the surface of that side of the support means Z2 which faces the adapter Z1 upon use. The journal Z2a therefore also does not pass as far as into the bottom of the journal hole when the support means is placed onto the adapter.

The adapter Z1 is provided with a through hole Z1e, at the end of which, which faces the support means, a thread Z1e1 is cut and which is dimensioned in such a way that a screw Z3 for screwing the support means Z2 fixedly to the adapter Z2 can be advanced through the through hole Z1e as far as to the thread Z1e1, can be screwed through the threaded hole Z1e1 there with its thread Z3a which is provided only at the front end, is subsequently held captively and protrudes with a slight axial play. The support means has a blind threaded hole Z2e which is provided such that it is recessed from the surface which faces the adapter Z1 upon use, to be precise by a depression which corresponds at least to the height of the thread Z3a of the screw Z3 in the support means, with the result that, when the support means is placed onto the adapter Z1, the screw Z3 can be pulled away from the support means and, as a result, there is not no engagement between the threaded hole Z2e and the screw thread Z3a, but rather the section of the screw Z3 with the thread Z3a can move freely to and fro by a slight amount in the depressed region Z2e1, and an engagement of the thread Z3a with the thread Z2e also becoming possible only after advancing of the screw Z3 in the direction of the arrow Z4.

The arrangement is used as follows:

After correct mounting of an intermediate element on the support means, to which end, in particular, the gauge which is described in the preceding text can be used, in particular with a correspondingly arranged gauge counterpiece for the support means which is described here, the support means is generally guided up to the adapter in such a way that first of all the journal Z2b which protrudes further passes in a positively locking connection into the journal hole Z1b on the adapter. With careful further approaching, the support means is then rotated around the journal Z2b which has already penetrated partially into the journal hole Z1b, until the second round journal/round hole pair Z1a, Z2a also come into engagement. The support means is then fixed lightly under fingertip pressure against the adapter, the circumferential edge Z2c being seated on the adapter Z1 and the screw Z3 then being moved in the direction of the arrow Z4 and its thread Z3a being screwed into the blind threaded hole Z2e and being tightened firmly, pressing forces acting merely in the region of the circumferential edge Z2c, but not on the positively locking elements.

The arrangement can be readily released and a permanently wear-free change is possible.

A further variant is now to be described with reference to FIG. 13 to FIG. 16.

According to FIG. 13, an intermediate element 13-1 which is denoted generally by 13-1 for the arrangement of a probe pin 13-2 with respect to the probe pin carrier 13-3 of a coordinate measuring machine comprises a base body 13-1a which is in a single piece here with a probe pin end 13-1a' which has a coupling element 13-1a'' and a means 13-1a''', in order to ensure a reproducible rotational alignment with respect to the probe pin carrier 13-3 of the coordinate measuring machine, and which has, at the probe pin end 13-1a, a bearing face which is inclined in a fixed manner with respect to the axis of the coupling element, is provided in a general ball segment form which is flattened by the bearing face, and is configured with a positively locking and/or frictional means for the positively locking and/or frictional engagement with a fastening end 13-2' of the probe pin in contact with the bearing face.

As can readily be seen from FIGS. 15a and 15b, the intermediate element 13-1 can have shanks $13\text{-}1a^V$ of different lengths. Toward the machine end, the blank has a widened foot $13\text{-}1a^{VI}$ which is formed integrally with the shank, is preferably formed with the latter by being milled from one solid piece. The same applies to the ball end $13\text{-}1a^{VII}$ which is likewise preferably formed integrally with the shank and the foot. However, it is likewise to be mentioned as a possibility that a fixed connection might be produced in the case of a multiple-piece construction and by welding, brazing, adhesive bonding, etc. before machining of the bearing face.

In a deviation from the abovementioned variants, the coupling element $13\text{-}1a^{III}$ is then not realized as a swivel coupling element, but rather is realized by a single screw thread for a fastening screw 13-4, by way of which the intermediate element can be screwed fixedly to the machine end. The reproducible rotational alignment is ensured by two, preferably differently dimensioned journals which can penetrate into recesses in the intermediate element 13-1 or its bearing face and are seated without play in their receiving holes.

With regard to the production, it will be understandable from the preceding text that the bearing face can also be produced for the intermediate elements of the variant described in the preceding text by milling of the ball element with suitable fixing, for example in a gauge, of the intermediate element blanks which are to be machined.

The advantage of the present variant can be seen in the production which is simplified further. In many cases, as a result, the costs can be reduced for the provision of an intermediate piece which can still be aligned as desired.

What is claimed is:

1. An intermediate element for the arrangement of a probe pin with respect to the probe pin carrier of a coordinate measuring machine, having a single-piece base body with a probe pin end and a machine end, the machine end being provided with a coupling element and with a means for ensuring a reproducible rotational alignment, and the probe pin end having a bearing face which is inclined in a fixed manner with respect to a longitudinal axis of the coupling element, the fixed inclined bearing face being provided on a ball segment which is flattened at the bearing face, and one of a positive locking means and frictional means for secured engagement with a fastening end of the probe pin that is in contact with the bearing face.

2. The intermediate element as claimed in claim 1, wherein the coupling element is a swivel coupling element.

3. The intermediate element as claimed in claim 1, wherein the means for ensuring a reproducible rotational alignment has a pair part of a non-rotationally symmetrical positive locking means pair which interacts with a complementary machine-side pair part.

4. The intermediate element as claimed in claim 1, wherein the inclined bearing face is milled off from the base body, and the ball segment is formed as a partially spherical base body having the bearing face formed as a planar bearing face inclined relative to the longitudinal axis of the coupling element.

5. The intermediate element as claimed in claim 1, wherein the swivel coupling element is configured as a journal which is configured for being received in a journal bearing, and which can be adhesively bonded into a journal hole receptacle.

6. The intermediate element as claimed in claim 1, wherein the positive locking or frictional means is formed as a threaded hole, into which the probe pin can be screwed, the threaded hole being drilled with a threaded hole axis being disposed perpendicularly to the bearing face.

7. The intermediate element as claimed in claim 1, including a multiplicity of intermediate elements in the form of respective blanks with each blank produced with a swivel coupling element and at least one face which is parallel to the swivel coupling element axis and the blanks are milled in order to produce bearing faces with different respective inclinations.

8. The intermediate element as claimed in claim 7, wherein the blank is arranged in an angle holder by at least one of clamping or placing and then face milled.

9. The intermediate element as claimed in claim 7, wherein the blank is partially spherical before being milled in the region of the bearing face to be formed.

10. The intermediate element as claimed in claim 1, wherein the intermediate element is in the form of a blank which blank has, furthermore, a region which is shaped as a spherical cap and is dimensioned in such a way that a support for the probe pin is formed by milling the blank with a diameter which is sufficient as a support face for the probe pin.

11. The intermediate element as claimed in claim 10 including a spacer piece which is machined further, with means for fixing the rotational direction of the machined blank, wherein the means for fixing the rotational direction comprise at least one of a means for pushing the machined blank into a position which fixes the rotational direction and a receptacle for receiving the machined blank in an adhesive bond which fixes the rotational position.

12. The intermediate element as claimed in claim 1, wherein the swivel coupling element is configured as a journal and the journal has a depression, and a groove, by way of which, the intermediate element can be pushed against the bearing face by a fixing means.

13. The intermediate element as claimed in claim 1 wherein a respective threaded hole or a milled through hole for a fastening screw is made perpendicularly in the bearing face after milling the bearing face.

14. A support means for attaching a probe pin to an adapter, which probe pin is provided on an intermediate element, wherein the support means has positive locking elements for the unambiguous orientation of the support means on their positive locking connection with complementary elements on the adapter, wherein at least two positive locking elements form journal/round hole pairs with their respectively assigned complementary element and both journal/round hole pairs have different diameters.

15. The support means as claimed in claim 14, wherein a threaded hole is provided for screwing the support means to the adapter by means of a screw, a threaded blind hole which is arranged in a recessed manner, for receiving a fastening screw which is held captively on the adapter.

16. The support means as claimed in any of claim 15, wherein pressing faces for pressing against the adapter are provided close to an edge region, including a pressing face which runs around in an elevated manner.

17. A support means for attaching a probe pin to an adapter, which probe pin is provided on an intermediate element, wherein the support means has positive locking elements for the unambiguous orientation of the support means on their positive locking connection with complementary elements on the adapter, wherein at least two differently shaped positive locking elements are provided which interact with respective complementary elements on the adapter, the differently shaped positive locking elements being configured for an interaction with their respective complementary elements in such a way that they come into engagement one after another upon attachment of the support means to the adapter, said positive locking elements being formed with projections which protrude beyond the interface to a different extent, and wherein at least that positive locking element which comes into engagement as a first element with its complementary element upon the support means approaching the adapter being a round element and forming a round journal/round hole pair with its associated complementary element.

18. A method for producing a multiplicity of intermediate elements for a coordinate measuring machine having a probe pin mounted with respect to a probe pin carrier, providing a single-piece base body with a probe pin end and a machine end, the machine end being provided with a coupling element, said multiplicity of intermediate elements being in the form of respective blanks with each blank provided with a swivel coupling element and at least one face which is substantially parallel to the swivel coupling element axis and the blanks are milled in order to produce bearing faces with different inclinations, wherein each blank that is provided is spherical before being milled in the region of the bearing face to be formed.

19. The method according to claim 18, wherein a respective threaded hole or a milled through hole for a fastening screw is made perpendicularly in the bearing face after milling.

20. The method according to claim 18, wherein the blank is arranged in an angle holder by at least one of clamping or placing and then face milled.

21. The method according to claim 18, wherein the bearing face is milled to provide an inclined planar bearing face.

* * * * *